Feb. 27, 1940.   J. A. GROW   2,192,076
CORN CRACKER AND GRADER
Filed March 8, 1939   3 Sheets-Sheet 2
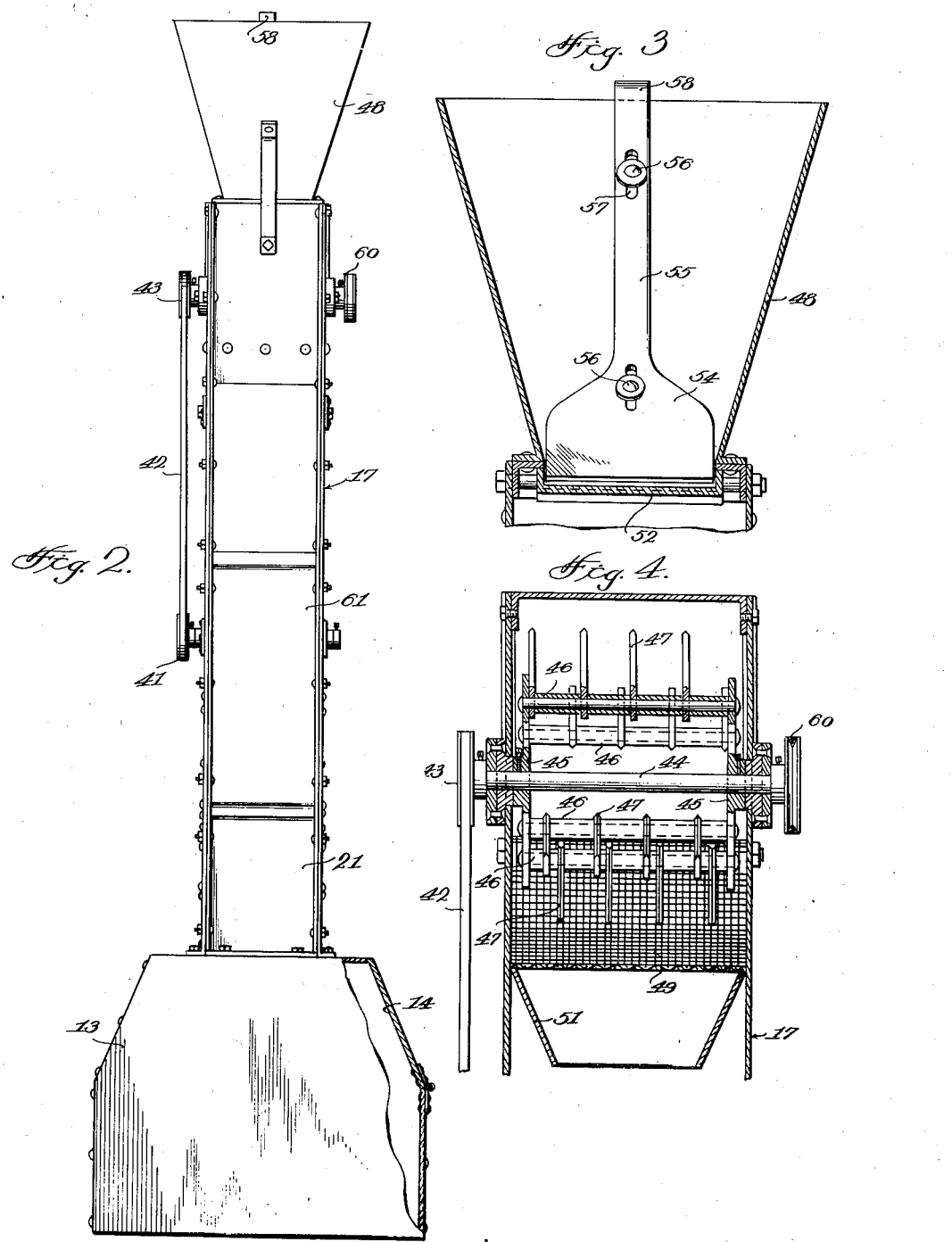
James A. Grow   INVENTOR
BY Victor J. Evans & Co.
ATTORNEYS

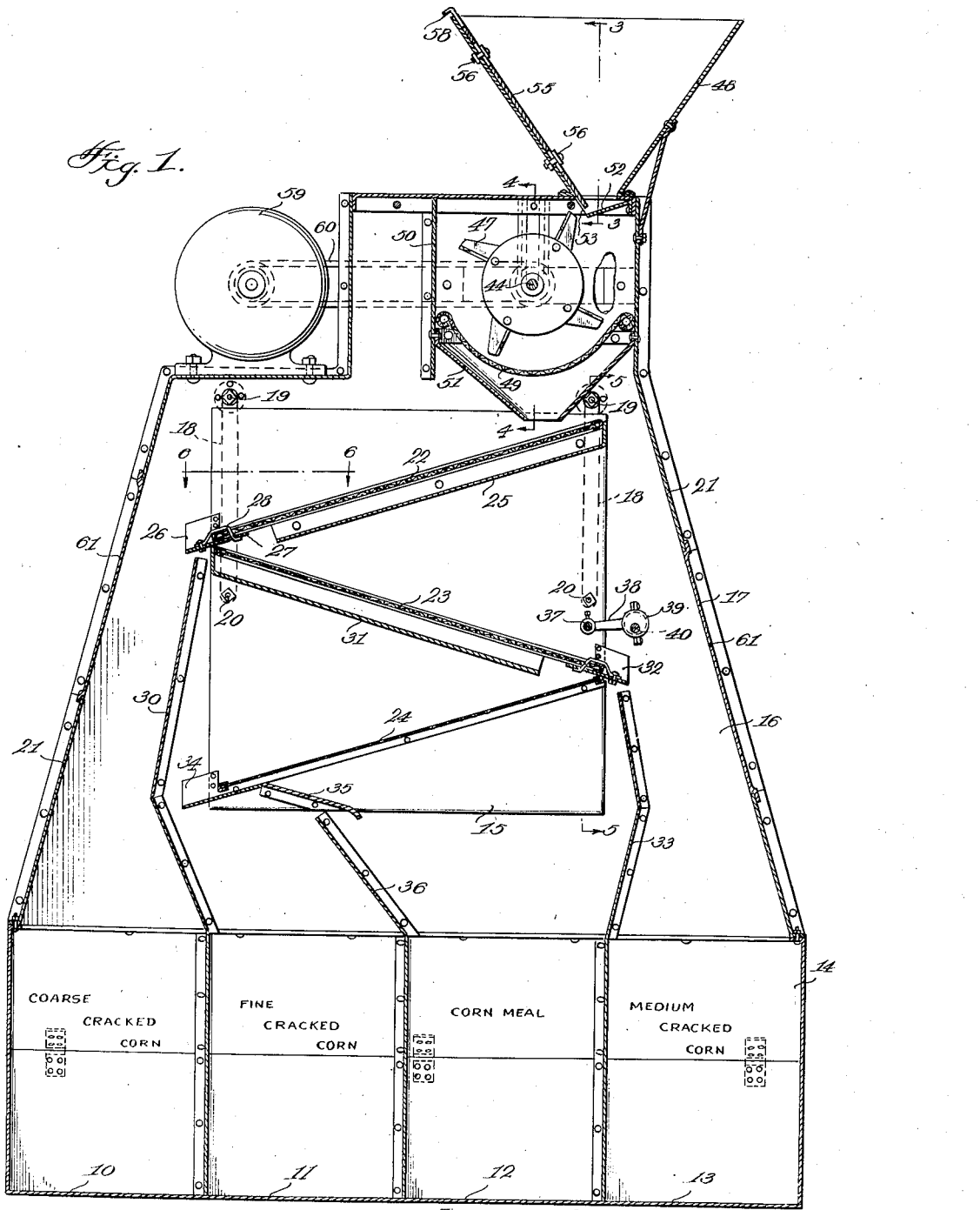

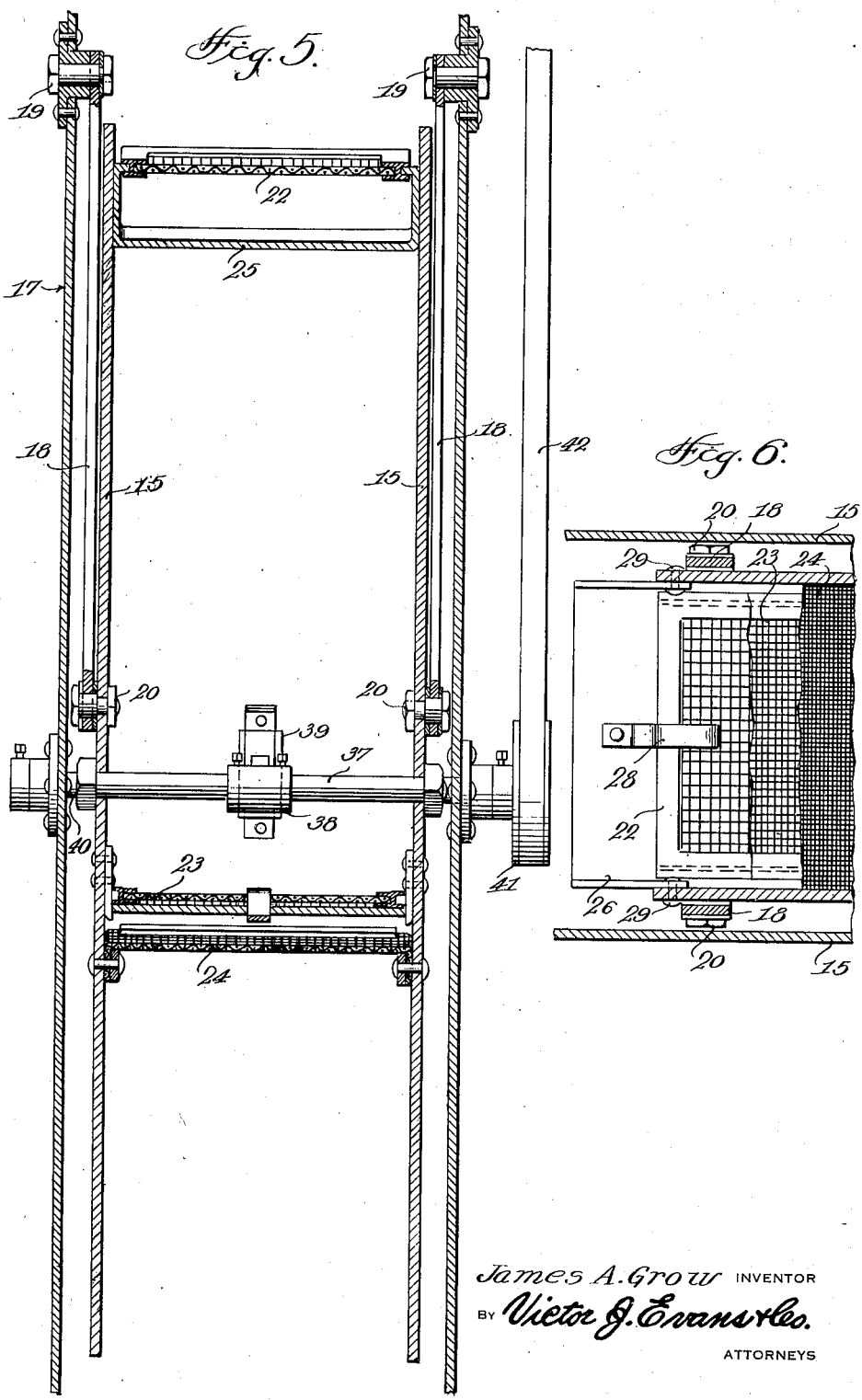

Patented Feb. 27, 1940

2,192,076

UNITED STATES PATENT OFFICE 2,192,076

CORN CRACKER AND GRADER

James A. Grow, Columbus, Ind.

Application March 8, 1939, Serial No. 260,645

1 Claim. (Cl. 209—315)

This invention relates to a corn cracker and grader and has for an object to provide a device of this character which will efficiently, with small horse power, and in minimum time, cut shelled corn into four different sizes, a coarse cracked corn, a medium cracked corn, a fine cracked corn, and corn meal, separate the different sizes, and store the separated sizes into respective bins.

A further object is to provide a device of this character which will employ shaker screens arranged to occupy minimum space and arranged in a vertical stack, the screens terminating in delivery spouts and certain of the screens having depending therefrom collecting troughs for delivering cut corn on to the screen next underneath, to the end that the cut corn will be graded and delivered into the storage bins approximately as fast as it is cut.

A further object is to provide a device of this character which will be formed of a few strong simple and durable parts, which will be compact in size to occupy minimum floor space, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a longitudinal sectional view of a corn cracker and grader constructed in accordance with the invention.

Figure 2 is an end elevation of the device shown in Figure 1.

Figure 3 is a detail cross sectional view taken on the line 3—3 of Figure 1 looking toward the hopper outlet valve.

Figure 4 is a cross sectional view taken on the line 4—4 of Figure 1 showing the cutting knives.

Figure 5 is a cross sectional view taken on the line 5—5 of Figure 1 showing the shaker and eccentric operating means therefor.

Figure 6 is a cross sectional view taken on the line 6—6 of Figure 1 showing the delivery end of the uppermost shaker.

Referring now to the drawings in which like characters of reference designate similar parts in the various views, 10, 11, 12 and 13 designate bins respectively, for coarse cracked corn, fine cracked corn, corn meal, and medium cracked corn, arranged in a longitudinal row in the order named, and preferably formed of sheet metal, although other material may be used. As shown in Figure 2, each bin is provided in one side with a hinged door 14 through which the contents of the bin may be removed. The bins are open at the top.

A shaker cage, comprising substantially rectangular side walls 15, is suspended from the side walls 16 of the body casing 17 of the mill. The casing rises from the tops of the bins and has the end walls sloping inwardly and upwardly as best shown in Figure 1. Hanger arms 18 are pivoted at the upper ends to the side walls of the casing as shown at 19 and are pivoted at the lower ends to the side walls of the shaker cage as shown at 20 so that the cage may swing pendulum-wise between the sloped end walls 21 of the mill.

A plurality of screens, 22, 23, and 24 are secured in superposed relationship in the shaker cage, the upper screen 22 being of comparatively coarse mesh to let medium cracked corn gravitate therethrough, and sloping downwardly toward one sloped end wall of the casing. This screen is provided on the underneath side with a collecting trough 25 which delivers the medium cracked corn to the next underneath, that is, the intermediate screen 23.

The lower end of the uppermost screen 22 is equipped with a delivery spout 26 having a projection 27 on the bottom which overlaps the bottom of the screen, and having a leaf spring 28 on the bottom which is adapted to be engaged through the screen 22 and hooked over the underneath surface of the projection 27 as best shown in Figures 1 and 6, to removably hold the screen in place. The upper end of the screen is removably held by the spring against the upper end wall of the delivery trough 25. The sides of the delivery spout are riveted as shown at 29 to the sides of the shaker cage.

A divider wall 30 is located below the delivery end of the uppermost screen 22 and extends downwardly to the bin 10 for coarse cracked corn. The coarser grains of cracked corn will thus gravitate along the screen 22 while the shaker cage is being reciprocated as will presently be described, and be guided by the divider wall 22 into the coarse cracked corn bin 10 while all other sizes will, as previously explained, be collected by the trough 25 and deposited at the upper end of the intermediate screen 23.

The intermediate screen 23 is likewise provided on its underneath face with a collecting trough 31 which is closed at the upper end and open at the lower end and is of finer mesh than the upper screen to discharge all cracked corn except medium cracked corn on to the lowermost screen. The medium cracked corn however, gravitates down the intermediate screen to the bottom thereof. The bottom of the screen is equipped with a delivery spout 32 which is similar to the delivery spout 26 and discharges medium cracked corn into the space between the other sloped wall 21 of the casing and a divider wall 33 similar to the divider wall 30, and which directs the gravitating medium cracked corn into the medium cracked corn bin 13.

The lowermost screen 24 is of finer mesh than the intermediate screens and is equipped at the lower delivery end with a delivery spout 34 similar to the delivery spout 26 above described which delivers fine cracked corn against the rear side of the separator wall 30 from which it gravitates into the fine cracked corn bin 11. The lowermost screen is also equipped with a downwardly and rearwardly extending separator wall 35 which is superposed above a separator wall 36 and these walls deflect gravitating corn meal from the lowermost screen into the corn meal bin 12.

The means for shaking the shaker screen comprises a shaft 37 which is secured at the ends in the side walls 15 of the shaker screen and is connected to the rod 38 of an eccentric 39 which is mounted on a shaft 40 journaled in the side walls of the body casing 17 and equipped exteriorly of one of the side walls with a drive pulley 41, best shown in Figure 5. A belt 42 is trained over this pulley and over a pulley 43 carried by the drive shaft 44 of the cutting head, best shown in Figures 1 and 2. Reciprocatory movement of the eccentric oscillates the shaker screen pendulum-like on the arms 18 to facilitate operation of the grading screens.

The cutter head, as best shown in Figure 4, comprises a pair of discs 45 fixed to the shaft 44. A plurality of tubular rods 46 are secured at the ends to the discs and extend parallel with the shaft 44. Each rod is equipped with a plurality of knives 47, the knives of all of the rods being so spaced as to operate on respectively different areas of the shelled corn gravitating from a hopper 48 which is secured to the casing of the mill above the cutter head. A wire mesh screen 49 is mounted below the cutter head and both the screen and cutter head are arranged in a corn cracking compartment in the upper end of the mill casing formed through the medium of a partition 50 which extends transversely across the upper end of the casing and extends to a point below the screen.

A funnel shaped delivery spout 51 is secured to the partition and to the casing and terminates at a point adjacent the upper end of the uppermost screen 22. This spout delivers the cracked corn on to the upper end of the screen to be graded during passage through the shaker cage as previously described.

The hopper 48 is provided with a sloped bottom 52 which is spaced at the lowest end below one of the walls of the hopper to provide a delivery opening 43 adjacent to the path of the knives of the cutter head as best shown in Figure 1. A slide valve 54, in the nature of a plate is provided with a shank 55 which is slidably secured to the side wall of the hopper through the medium of bolts 56 engaged through slots 57 in the shank and engaged through the hopper side wall. The shank projects above the upper end of the hopper and is provided with a handle 58 through the medium of which the valve may be opened or closed to control the flow of shelled corn from the hopper to the delivery opening 53.

An electric motor 59 is mounted on the top of the mill casing 17 and is connected to the cutter head shaft 44 through the medium of a belt drive 60.

To permit access to the screens for removing the screens for cleaning, doors 61 are arranged in the sloped side walls 21 of the mill casing, as best shown in Figure 1.

In operation shelled corn gravitates from the hopper 48 when the valve 54 is opened and encounters the rotating knives 47 which crack the corn into various sizes. The cracked corn gravitates through the coarse mesh screen 49 into the spout 51 and is delivered to the upper end of the uppermost screen 22. The coarse cracked corn will be discharged from this screen into the coarse cracked corn bin 10 while the remaining sizes will gravitate through the screen and be delivered by the collecting trough 25 to the upper end of the intermediate screen 23. Medium cracked corn will roll down this screen and be delivered to the medium cracked corn bin 13 while fine cracked corn and corn meal will be delivered by the collecting trough 21 to the upper end of the lowermost screen 24. Fine cracked corn will roll down this screen and be delivered into the fine cracked corn bin 11, while corn meal will gravitate through the screen and be delivered to the corn meal bin 12.

From the above description it is thought that the construction and operation of the invention will be fully understood without further explanation.

What is claimed is:

In a corn cracker and grader, corn classifying means comprising a plurality of bins for respectively different sizes of cracked corn, a casing supported on top of the bins and communicating therewith, a shaker cage having side walls mounted to swing pendulum-wise in the casing above the bins, means for shaking the cage, a plurality of downwardly inclined screens arranged in a vertical stack between said walls, said screens being progressively smaller in mesh respectively from the upper to the lower screen, the delivery ends of each two contiguous screens being reversed with respect to each other to discharge from opposite ends of the cage, a collecting trough on the bottom of each screen delivering cracked corn to the top of the next underneath screen, divider walls disposed below the delivery ends of the screens for directing different sizes of cracked corn into their respective bins, a delivery spout for each screen fixed to the shaker cage walls and having a projection overlapping the bottom of the screen, and a leaf spring on said delivery spout adapted to be engaged through the screen and hook over the underneath surface of the screen to removably hold the screen in place on the shaker cage walls.

JAMES A. GROW.